A. H. MIDGLEY & C. A. VANDERVELL.
ELECTROMAGNETIC POWER VELOCITY RATIO DEVICE, PARTICULARLY APPLICABLE FOR DRIVING AUTOMOBILES.
APPLICATION FILED MAY 7, 1909.

993,611.

Patented May 30, 1911.

3 SHEETS—SHEET 2.

WITNESSES
W. P. Burk
George Heerbrandt

INVENTORS
Albert Henry Midgley
Charles Anthony Vandervell
BY
ATTY

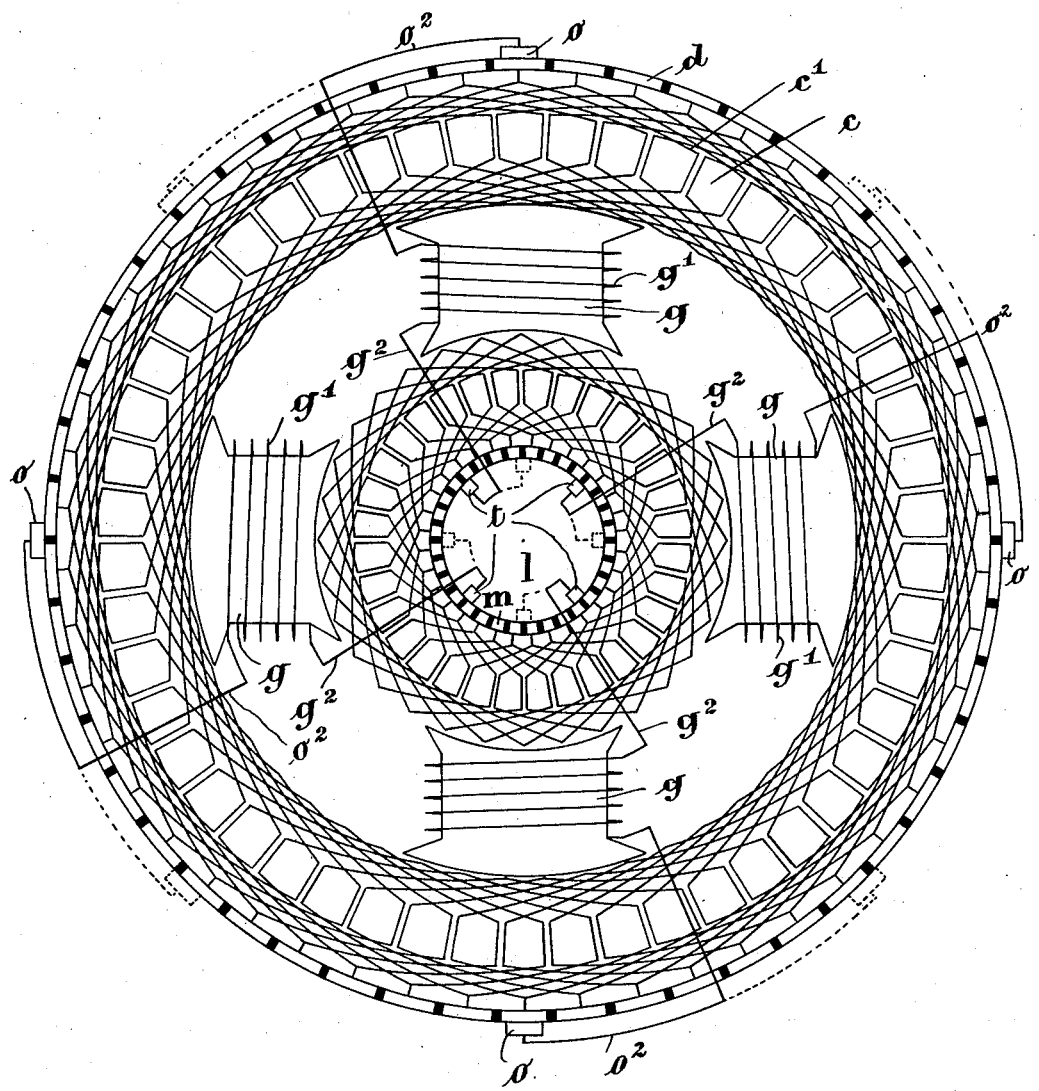
Fig:4.

UNITED STATES PATENT OFFICE.

ALBERT HENRY MIDGLEY, OF FOREST GATE, AND CHARLES ANTHONY VANDERVELL, OF ACTON VALE, ENGLAND.

ELECTROMAGNETIC POWER-VELOCITY-RATIO DEVICE, PARTICULARLY APPLICABLE FOR DRIVING AUTOMOBILES.

993,611.      Specification of Letters Patent.      Patented May 30, 1911.

Application filed May 7, 1909. Serial No. 494,663.

*To all whom it may concern:*

Be it known that we, ALBERT HENRY MIDGLEY, subject of Great Britain, residing at Forest Gate, Essex, England, and CHARLES ANTHONY VANDERVELL, subject of Great Britain, residing at Acton Vale, Middlesex, England, have invented new and useful Improvements in and Relating to Electromagnetic Power-Velocity-Ratio Devices, Particularly Applicable for Driving Automobiles and the Like, of which the following is a specification.

This invention relates to an improved form of power velocity ratio gearing for transmitting energy from a source of power to a recipient device so as to obtain a variable ratio in the speed of the two devices, and has for its object the construction and arrangement of such a device in a simple and effective manner of considerably reduced weight compared to known machines, and in such a way that a direct drive can be produced when the driving and driven elements attain practically the same speed.

To carry this invention into effect we arrange a dynamo electric machine having one set of field magnets and two armatures, one armature revolves and is disposed within the field magnets and the other armature is fixed and is therefore disposed so as to surround the field magnets which revolve.

The magnetic circuit between any pair of magnetic elements is completed through the magnetic parts of the outer and inner armatures, so that, the outer armature forms the magnetic yoke of the electromagnets in their relation to the inner armature, and the inner armature forms the magnetic yoke of the electromagnets in their relation to the outer armature.

In order that the invention may be the better understood, we will now proceed to describe the same in relation to the accompanying drawing, reference being had to the letters and figures marked thereon.

Like letters refer to like parts in the several figures.

Figure 1:
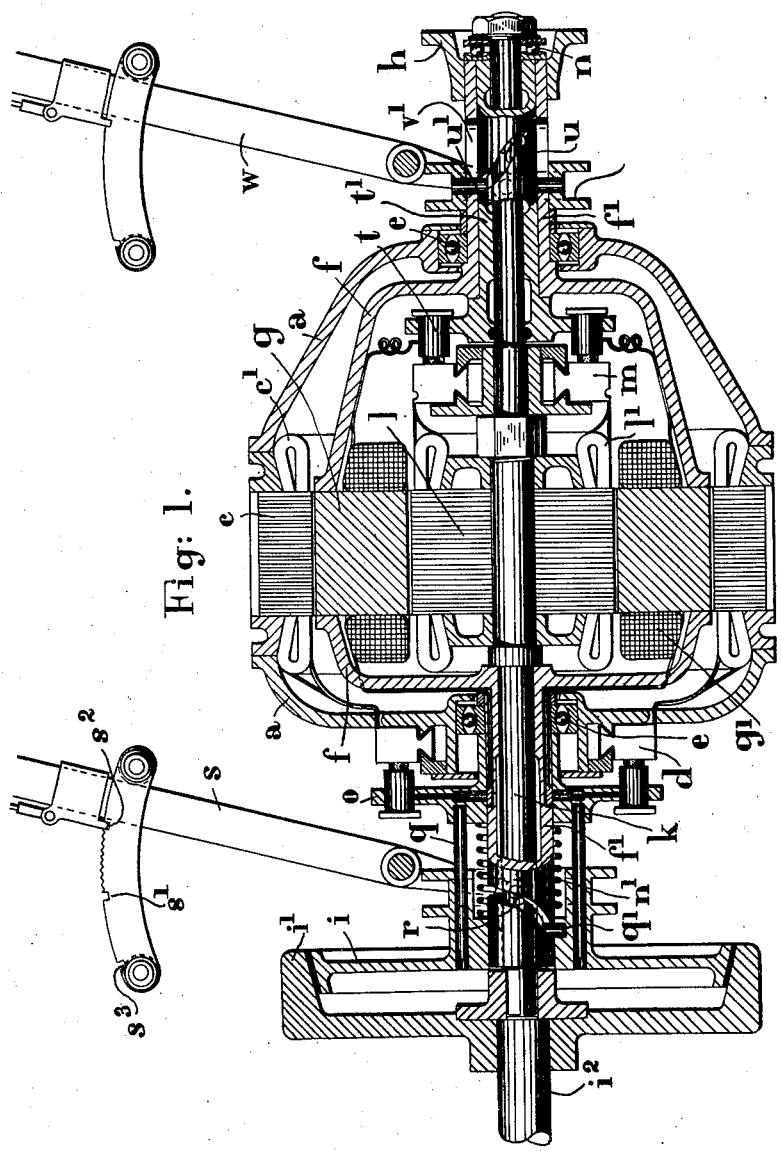
Figure 2:
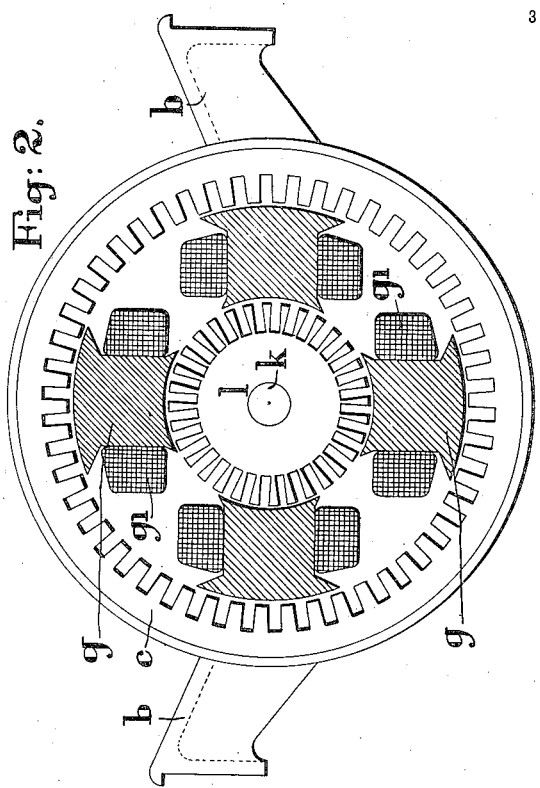
Figure 3:
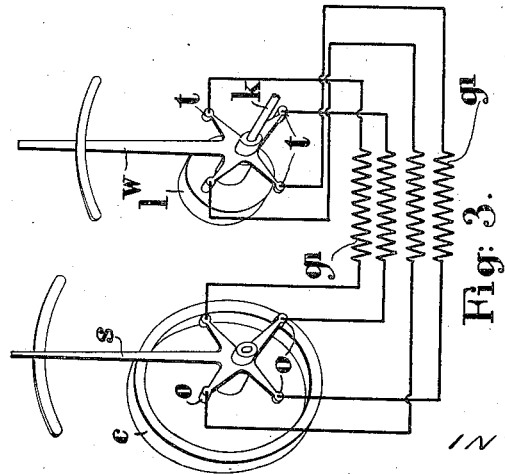

Figure 1 is a longitudinal section of one form of our invention. Fig. 2 is a part transverse section of the field magnets and armatures, the coils being removed from the latter. Fig. 3 is a diagrammatic view of the electrical elements and their connections. Fig. 4 is a diagrammatic view of the windings employed.

Upon a casing $a$ having suitable brackets $b$ for mounting the device in position is fixedly carried the outer or motor armature $c$ having coils $c^1$ connected to a commutator $d$. Within bearings $e$ preferably of the antifriction type carried by the casing $a$ is revolubly carried the framework $f$ on which are mounted the field magnets $g$ with coils $g^1$, one end of said coils being electrically connected to the brushes $t$ by the conductors $g^2$ a certain amount of slackness in the said conductors being provided in order that a partial relative rotation of the brushes $t$ and field magnet coils $g^1$ may take place, the other end of the coils $g^1$ being connected electrically to the brushes $o$. In this instance owing to the external disposition of the brushes $o$, contacts $o^1$ are provided, said contacts being connected to the coils $g^1$ by the insulated conductors $o^2$, see Fig. 4. Spring pressed brushes $o^3$ in electrical connection with the brushes $o$ are provided, said spring pressed brushes $o^3$ contacting with the contacts $o^1$ under all circumstances. The hollow shaft $f^1$ of the framework $f$ at one end carries the coupling $h$ to which the driven mechanism is attached while the opposite end of the said shaft slidingly carries the internal part of a cone clutch $i$ adapted to engage with the external part of such clutch $i^1$ mounted on the shaft $i^2$ of the prime mover; this said part may be the fly wheel of the latter in the usual way.

Through the hollow shaft $f^1$ is arranged the revoluble shaft $k$ carrying the inner or dynamo armature $l$ having coils $l^1$ connected to the commutator $m$. This shaft $k$ is directly connected to the shaft $i^2$ of the prime mover in the usual way and has a ball thrust bearing $n$ at one end in order to take the reaction of the spring $n^1$ which is adapted to force the two parts $i$ and $i^1$ of the clutch into engagement.

The brushes $o$ for the commutator $d$ are mounted on the hollow shaft $f^1$, and are rotated by rods $q$ sliding through holes in the clutch element $i$ which is provided with an inwardly projecting pin $q^1$, which engages with a helical slot $r$ in the hollow shaft $f^1$. The clutch element $i$ is provided with an operating lever $s$ which not only withdraws the clutch from action but rocks the brushes $o$ around the commutator $d$ relative to the field magnets.

The brushes $t$ for the commutator $m$ are mounted on a sleeve $t^1$ rotatably carried on the shaft $i^2$ and within the shaft $f^1$. The sleeve $t^1$ has a helical slot $u$ into which engages a pin $u^1$ carried by the grooved collar $v$, the said pin passing through a parallel slot $v^1$ in the shaft $f^1$, so as to be guided in a direction parallel with the axis of the shaft $f^1$, a lever $w$ being provided for operating the collar $v$ axially while the machine is in motion. In this way it will be seen that the brushes $t$ which are electrically connected as hereinbefore described with the field magnets $g$ can be rocked about the axis of the machine relative to the field magnets.

The operation of the device can be readily seen by reference to the drawings; we will assume that the prime mover is running and driving the shafts $i^2$ and $k$ and that the driven mechanism is stationary, the lever $s$ being in the mid position and the lever $w$ in the extreme left hand position, in consequence the brushes $o$ and $t$ will be in the position indicated in full lines in Fig. 4. The armature $l$ will now be running, but owing to the position of the brushes no current will be generated, if now the lever $w$ which controls the position of the brushes $t$ be moved from the left position toward the right the brushes $t$ are rocked relative to the field magnet $g$, and a current is generated in the armature $l$ which flows through the field magnet coils $g^1$ to the armature $c$, so that the armature $l$ exerts a pull and the armature $c$ exerts a thrust on the field magnets $g$ to move them in the same direction as the armature $l$ is revolving. As the movement of the brushes $t$ is continued the torque of the field magnets will gradually increase until the lever $w$ is in its extreme right hand position, the brushes $t$ are now in the position indicated in dotted lines in Fig. 4. To increase the speed still further the lever $s$ which controls the position of the brushes $o$ is moved from the middle slot $s^1$ toward the right, thereby rocking the brushes $o$ relative to the field magnets $g$, the speed gradually increasing until the lever $s$ is in the slot $s^2$, the brushes $o$ then being in the position indicated in Fig. 4 in dotted lines. Under these conditions the inner clutch element $i$ can engage with the outer clutch element $i^1$; the machine having now attained its highest speed and its condition of direct drive.

The windings on both armatures are preferably of the " chord " type as illustrated in Fig. 4 of the drawing whereby we obtain a neutral zone between the pole tips owing to the current flowing through one set of conductors in one direction and through the adjacent conductors in the opposite direction, therefore it will now be seen that, as when the lever $w$ is moved toward the right and in consequence the brushes $t$ are rotated relatively to the commutator $m$, the neutral zone of the armature $l$ moves from under the pole faces of the magnets $g$ and the active zone of the armature $l$ gradually comes into operation.

In the case of the motor armature $c$ the operations are reversed, that is, when the lever $s$ is in the slot $s^1$, the brushes $o$ are in such a position relative to the armature $c$ that the active zone of the armature is in the magnetic field. Now as the lever $s$ is moved to the slot $s^2$ the active zone of the armature is gradually moved out of the magnetic field and replaced by the neutral zone, therefore as the lever $s$ is moved toward the right the force exerted by the armature $c$ gradually decreases and the speed of the magnets $g$ gradually increases until the difference of speed between the magnets $g$ and the armature $l$ is only sufficient to generate the necessary E. M. F. to overcome the electrical copper losses in the machine.

To obtain the reverse direction of rotation of the magnets $g$ the levers $s$ and $w$ are returned to their normal position, that is to say the lever $s$ is placed so as to engage in the slot $s^1$ and the lever $w$ is placed to the extreme left, the operation is then as follows:—Lever $s$ is first moved toward the left to the slot $s^3$ moving the brushes $o$ through an angle equivalent to the pole angle of the magnets $g$, this action moves each brush $o$ into the position occupied by the following brush when the lever $s$ is in the slot $s^2$ for forward motion and consequently the thrust to be produced when current flows in the armature $c$ will be in the opposite direction to that produced in the previous instance. If the lever $w$ is now gradually moved to the right actuating the brushes $t$ in exactly the same manner as before a current will be generated in the armature $l$ and therefore the thrust of the motor armature $c$ will be in the opposite direction to the pull of the dynamo armature $l$.

The number of conductors on the armature $c$ and the armature $l$ must be so arranged that the thrust of the armature $c$ is greater than the pull of the armature $l$ therefore the field magnets $g$ will then revolve in a reverse direction.

Should it be desirable not to use the lever $s$ for obtaining reverse motion any known mechanical reversing mechanism can be inserted in any convenient position in the transmission gear.

In large gears in which a friction clutch is not desirable, a greater speed of the field magnets $g$ can be obtained by gradually short circuiting the coils of the armature $c$, so that the armature $c$ exerts no thrust on the field magnets $g$, the latter following the motion of the armature $l$ with a small amount of lag.

It will be understood that although we have only described our invention with reference to a series wound machine with brush control, it is obvious that a shunt or separate excitation system or a combination of any of them can be used for the field magnets in known manner, and any known system of controlling mechanism can be equally applied without departing from the essence of our invention.

By using the two armatures and the field magnets with known means for conveying current from one armature to the other, the apparatus can be used as a simple ratio gearing without any substantial variation of mechanical advantage.

Having now particularly described and ascertained the nature of our said invention and in what manner the same is to be performed, we declare that what we claim is:—

1. An electromagnetic power velocity ratio device consisting of in combination a dynamo armature, a motor armature, and one set of field magnets common to the two armatures, the motor armature surrounding said magnets and the dynamo armature being surrounded by said magnets, the motor armature being fixed and the dynamo armature and field magnets being adapted to move relatively to one another and to the motor armature, means for exciting the field magnets, and means for conveying the current generated by one armature to the other armature, substantially as described.

2. An electromagnetic power velocity ratio device consisting of in combination a dynamo armature, a motor armature, and one set of field magnets common to the two armatures, the motor armature surrounding said magnets and the dynamo armature being surrounded by said magnets, the motor armature being fixed and the dynamo armature and field magnets being adapted to move relatively to one another and to the motor armature, means for exciting the field magnets, means for conveying the current generated by one armature to the other armature and adjustable means for varying the function of the current relative to the two armatures and the field magnets in order to vary the power velocity ratio and the direction of transmitted motion, substantially as described.

3. An electromagnetic power velocity ratio device consisting of in combination a dynamo armature, a motor armature, and one set of field magnets common to the two armatures, the motor armature surrounding said magnets, and the dynamo armature being surrounded by said magnets, the motor armature being fixed and the dynamo armature and field magnets being adapted to move relatively to one another and to the motor armature, means for exciting the field magnets, means for conveying the current generated by one armature to the other armature, brushes adapted to contact with the commutator of each armature and to connect with the field magnets, and means for rocking the said brushes relative to the field magnets so as to vary the current function and direction from one armature to the other and the reaction of the field magnets on the two armatures, substantially as described.

4. An electromagnetic power velocity ratio device consisting of in combination a dynamo armature, a motor armature, and one set of field magnets common to the two armatures, the motor armature surrounding said magnets and the dynamo armature being surrounded by said magnets, the motor armature being fixed and the dynamo armature and field magnets being adapted to move relatively to one another and to the motor armature, means for exciting the field magnets, means for conveying the current generated by one armature to the other armature, a mechanical clutch between the driving and driven elements and adjustable means for regulating the current generated in the dynamo armature to produce a positive mechanical drive when the driving and driven elements attain the same speed, substantially as described.

In testimony whereof, we have signed our names to this specification in the presence of two subscribing witnesses.

ALBERT HENRY MIDGLEY.
CHARLES ANTHONY VANDERVELL.

Witnesses:
RICHARD A. HOFFMANN,
WALTER CARVER.